April 18, 1933.  J. C. MORRELL ET AL  1,904,380
APPARATUS FOR VAPOR FRACTIONATION
Filed April 25, 1927
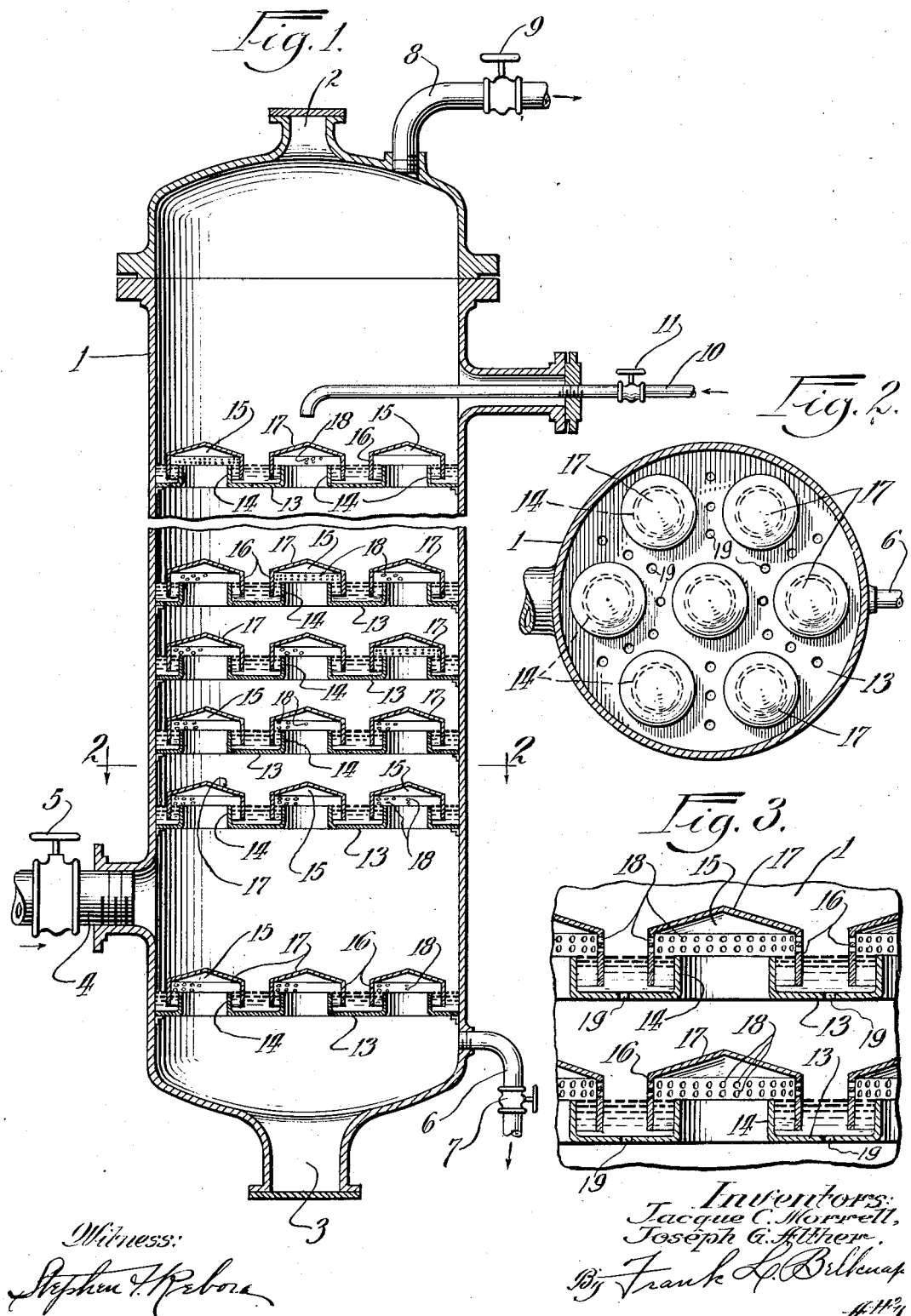

Patented Apr. 18, 1933

1,904,380

UNITED STATES PATENT OFFICE

JACQUE C. MORRELL AND JOSEPH G. ALTHER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

APPARATUS FOR VAPOR FRACTIONATION

Application filed April 25, 1927. Serial No. 186,219.

Our invention relates to apparatus for vapor fractionation, and refers more particularly to improvements in the fractionation of vapors resulting from the cracking of hydrocarbon oil under heat and super-atmospheric pressure. More specifically, the invention relates to improvements in fractionating apparatus whereby efficient separation of sufficiently cracked fractions from insufficiently cracked fractions takes place.

While our invention is particularly applicable to the treatment of hydrocarbon oil vapors, vapors from any source can be treated thereby, and the invention herein described is adaptable for use in connection with operations under vacuum, atmospheric or super-atmospheric pressure.

The general purposes of the invention are to provide a method whereby efficient fractionation of vapors may be obtained within a restricted area, and to maintain in separate stages in the fractionating instrumentality large bodies of liquid which tend to equalize the temperature exchange in each stage, facilitating the uniform composition of the vapors.

Among the objects of the invention are to bring about an intimate contact between the vapors and liquid while the liquid is in finely divided condition or in the form of films; to maintain bodies of liquid in each stage in the fractionating tower in equilibrium with vapors directly thereabove, whereby the lighter fractions in said bodies of liquid have an opportunity, i. e. time, to be released in vapor form; to provide a process in which withdrawal of liquid from the body in each stage is preferably from a point at which the heavier fractions collect so that, in reality, the heavier fractions comprise the major portion of the liquid descending to the liquid body in the stage immediately below.

These objects are brought about by maintaining a series of stages of bodies of liquid in a relatively quiescent state and in a condition approaching equilibrium with vapors, with the vapor in a continuous upward flow and the liquid in a continuous downward flow, without bubbling the vapors through the liquid.

In the specific embodiment of the invention, heated vapors are passed upwardly through a number of superimposed zones while subjected to the action of a cooling medium whereby the heavier fractions are condensed. The vapors and condensate are maintained under conditions of time and contact in each stage, whereby they tend to approach equilibrium. The vapors from one zone, after reaching a point as near an equilibrium as is possible with the reflux condensate separated in that zone, ascend in contact with condensate formed in a preceding zone whereby the equilibrium of the vapors is subjected to gradual change.

The utility and advantages of the invention will be more apparent from the following description:

In the drawing, Fig. 1 is a diagrammatic elevational view, partly in vertical section, of a fractionating column in which the invention may be carried out.

Fig. 2 is a horizontal cross-sectional view taken on line 2—2 of Fig. 1, and

Fig. 3 is an enlarged fragmentary detail view, illustrating the relation between two spaced decks.

Referring more in detail to the drawing, 1 designates a fractionating column or shell which may be provided with openings 2 and 3 at the top and bottom, whereby access may be had to the inside. The vapors to be treated in the fractionating column 1 may enter therethrough from line 4 in which may be interposed valve 5. The line 4 at its other end may be connected to a suitable part of a concurrently operating plant in which the vapors to be treated in the shell 1 evolve or separate during distillation or cracking.

In passing through the dephlegmator, as will be hereafter described, the vapors separate into insufficiently converted fractions, i. e., reflux condensate, and uncondensed fractions which remain in vapor form. The reflux condensate may be withdrawn from the lower portion of the dephlegmator shell through reflux draw-off line 6, in which may be interposed a valve 7 from which the reflux condensate may be passed to storage or returned for retreatment in the same system in which the vapors have been evolved, or may be subjected to retreatment in another zone. The vapors remaining uncondensed after passage through the dephlegmator may be withdrawn from the upper portion thereof through line 8, controlled by valve 9, from which they may be directed to a conventional type condenser, if desired. The products of this latter condensation may be collected in a suitable receptacle. The cooling and fractionation in the tower 1 may be assisted by injecting thereto, at any point throughout the height of the shell 1, a cooling medium as, for instance, liquid charging stock or a portion of the distillate, or the like, by means of pipe 10 in which may be interposed the valve 11.

Describing now more particularly the features which comprise the present invention, the vapors entering the dephlegmator 1 through line 4 ascend in the tower through a series of super-imposed decks, each deck comprising a supporting plate 13 provided with relatively short, upwardly projecting open end risers 14, which may be attached to the plate 13 in any desired manner, for instance, by welding, bolting, or otherwise. Over the upper end of each riser 14 is positioned a cap, designated as a whole 15, which preferably comprises a cylindrical flanged portion 16 disposed concentrically relative to the riser 14, the upper end of the flanged portion 16 being closed by means of a roof 17, which preferably takes a conical shape. Each cap 15 is supported in such a manner over the plate 13 that the lower edge of the flanged portion 16 is spaced a slight distance above the plate 13, and, further, the dimensions of each riser and the corresponding flanged portion 16 are such that the flanged portion extends for some distance above the top of the riser 14. The conical shaped roof 17 is preferably imperforate while the area of the flanged portion 16, which projects above the top of the corresponding riser, is preferably provided with a multiplicity of perforations such as illustrated at 18.

It is to be noted that the lower edge of each flange 16 is spaced only a short distance from the deck whereby the liquid overflowing through each riser is caused to pass under said lower edge and thus the heavier fractions, or those collecting in the bottom of each pool are caused to overflow.

The operation of the fractionating device shown is as follows: The vapors entering through line 4 and ascending in the fractionating column 1 meet the lowermost deck and are distributed through the multiplicity of risers 14. These streams of ascending vapors pass upwardly through the risers 14, then through the multiplicity of perforations 18 provided in the upper part of the flanges 16, then through the space provided between one deck and the deck next above, and finally through the risers 14 of said deck next above.

In their ascent, the heavier vaporous fractions separate from the lighter fractions as a liquid reflux condensate, the latter flowing in a general countercurrent direction to the vapors. To illustrate more completely the flow of the reflux and the method of fractionation, reference should be particularly had to Fig. 3. The reflux formed due to the passage of the vapors through and around the cap 15 of an upper deck accumulates on the plate 13. When the level of condensate reaches the upper end of the riser 14, said reflux overflows into the riser, falling in the form of a film upon the upper face of the conical roof 17 of each cap of the deck below. The reflux condensate falling on the cap flows over and falls in the form of a film over the outer face of the flanged portion 16, collecting in a pool in the space of the deck below as just described for the deck above. From there on the course of the reflux and vapors from deck to deck in their descent and ascent is similar and need not be described further.

In this manner the vapors and reflux condensate come in contact first when the vapors pass through the perforations 18 of a cap and then when the vapors sweep past the film of reflux condensate, flowing downwardly from the conical roof 17 to the pool maintained on the deck below. The vapors coming in contact with said film of reflux condensate break the latter into a multiplicity of finely divided particles which causes internal contact of the vapors and reflux and increased efficiency of dephlegmation. The vapors after passing through the perforations 18 and past the film of liquid condensate, as just described, pass up through the risers 14 of the plate above and in doing so pass through the circular film of reflux condensate overflowing from the plate above through the riser down to the conical roofs of the caps on the plate below. This causes an additional contact between the vapors and the reflux condensate and adds much to the efficiency of the process.

As a further feature of our invention, the shape and relative positions of the perforations 18 may be varied according to the result desired. For instance, these perforations may take the form of inclined ports, the slopes produced thereby functioning to bring the vapors slightly downward to retard their passage through the film of liquid condensate flowing over said perforations, thereby increasing the time of contact between the vapors and condensate; or the slope of these perforations may be such as to cause the vapors to discharge a curved jet which will increase the efficiency of fractionation due to the intimate contact between the vapors and condensate and further due to the separation of the condensate from the non-condensed vapors through centrifugal force.

It is obvious, of course, that there may be any number of risers 14 and corresponding caps 15 on each deck; further, that there may be positioned also in the tower any number of spaced decks, all positioned above the point at which the vapors enter from line 4, or some above and some below the point of entrance of the vapors from line 4, said lower decks assisting in removing from the condensate lighter fractions which may have become entrained therewith.

As a further feature of our invention, it is apparent that a relatively large body of reflux condensate is maintained on each deck between the risers 14, and that since the vapors do not bubble through such pools, the maintenance of such relatively large bodies of condensate on each deck will increase the time of contact afforded in each stage of fractionation of the vapors, thus permitting the vapors and condensate to reach a state of substantial equilibrium.

Another feature of our invention comprises the arrangement of the caps over the risers, this being such that there is no selective flow of any portion of reflux condensate more than any other portion, in that the lower layers of reflux condensate accumulating on the decks are withdrawn continuously due to the overflow arrangement described, which provides for a continuous replacement of treated portions of reflux condensate by fresh portions of reflux condensate at any given point in the fractionating device.

The caps and risers described may be of other shapes, as is obvious, where such designs are within the scope of our invention, and whereby the vapors are fractionated without bubbling through pools of reflux condensate.

Orifices 19 may be provided in each deck to permit draining of portions of the liquid body. The number and size of orifices should be carefully predetermined and so proportioned as to maintain a body of liquid on each deck and, at the same time, permit draining. This precaution should be taken in cases where the velocity of vapors ascending through the risers is high enough to cause undesired entrainment of the descending liquid.

While I have shown in the drawing the caps 15 as being disposed immediately below the riser 14 thereabove, it is obvious that this arrangement may be varied without departing from the scope of the invention, that is to say the caps 15 may be moved away from a point immediately below the risers 14 thereabove. The drain orifices 19 may be dispensed with, without destroying the efficiency of the invention.

We claim as our invention:

1. A dephlegmator comprising in combination a shell having vapor and liquid inlet and outlet, spaced superimposed decks mounted within said shell forming a plurality of chambers, relatively short upstanding open end risers projecting above the general plane of each deck through which vapors pass from a lower to a higher chamber, a cap mounted above each riser, each cap comprising a flange extending below and surrounding the upper limits of said riser having perforations therein above the upper end of said riser, and a top wall.

2. A dephlegmator comprising in combination a shell having vapor and liquid inlet and outlet, spaced superimposed decks mounted within said shell forming a plurality of chambers, relatively short upstanding open end risers projecting above the general plane of each deck through which vapors pass from a lower to a higher chamber, a cap mounted above each riser, each cap comprising an annular flange surrounding and extending below the projecting limits of said riser and provided with perforations above the upper end of said riser, and an imperforate top wall.

3. A dephlegmator comprising in combination a shell having vapor and liquid inlet and outlet, spaced superimposed decks mounted within said shell forming a plurality of chambers, relatively short upstanding open end risers projecting above the general plane of each deck through which vapors pass from a lower to a higher chamber, a cap mounted above each riser, each cap comprising an annular flange surrounding and extending substantially below the upper projecting edge of said riser and provided with perforations above the upper end of said riser, and an imperforate top wall, said imperforate top wall sloping downwardly toward the sides from an intermediate high point.

JACQUE C. MORRELL.
JOSEPH G. ALTHER.